United States Patent
Öhlund et al.

(10) Patent No.: US 12,071,384 B2
(45) Date of Patent: Aug. 27, 2024

(54) SOLID PHASE FERTILIZER COMPOSITION

(71) Applicant: AREVO AB, Umeå (SE)

(72) Inventors: Jonas Öhlund, Umeå (SE); Torgny Näsholm, Umeå (SE); Mattias Holmlund, Umeå (SE)

(73) Assignee: AREVO AB, Umea (SE)

( * ) Notice: Subject to any disclaimer, the term of this patent is extended or adjusted under 35 U.S.C. 154(b) by 0 days.

(21) Appl. No.: 16/301,116

(22) PCT Filed: May 16, 2017

(86) PCT No.: PCT/SE2017/050504
§ 371 (c)(1),
(2) Date: Nov. 13, 2018

(87) PCT Pub. No.: WO2017/200467
PCT Pub. Date: Nov. 23, 2017

(65) Prior Publication Data
US 2019/0292110 A1    Sep. 26, 2019

(30) Foreign Application Priority Data

May 16, 2016    (SE) .................................... 1650655-2

(51) Int. Cl.
*C05B 15/00*    (2006.01)
*C05B 13/06*    (2006.01)
(Continued)

(52) U.S. Cl.
CPC .............. *C05B 15/00* (2013.01); *C05B 13/06* (2013.01); *C05B 17/00* (2013.01); *C05G 1/00* (2013.01)

(58) Field of Classification Search
CPC ......... C05B 15/00; C05B 13/06; C05B 17/00; C05C 11/00; C05G 1/00; C05G 5/12; C05D 3/00; C05D 9/02; C05F 11/10
See application file for complete search history.

(56) References Cited

U.S. PATENT DOCUMENTS 3,620,757 A * 11/1971 Ellinger .................... A23G 9/40
426/565
3,723,602 A *  3/1973 Stahlheber .............. C01B 25/41
423/305
(Continued)

FOREIGN PATENT DOCUMENTS

AU    2014101391 B4 *  1/2015    ............. C05B 15/00
CN       1145062 A       3/1997
(Continued)

OTHER PUBLICATIONS

Ernest, "How is Solubility Affected by Polymer Chain Structure?", accessed from https://web.archive.org/web/20150403105303/https://socratic.org/questions/how-solubility-is-affected-by-polymer-chain-structure (Year: 2015).*

(Continued)

*Primary Examiner* — Jennifer A Smith
(74) *Attorney, Agent, or Firm* — Porter Wright Morris & Arthur LLP

(57) ABSTRACT

The present invention relates to a fertilizer composition comprising nitrogen and phosphorus, wherein nitrogen is provided by basic L-amino acid(s) complexed to polyphosphate(s). The complex may be precipitated with multivalent metal ion(s) to provide a solid phase fertilizer composition. The basic L-amino acid is advantageously L-arginine and/or L-lysine. The fertilizer composition is capable of providing controlled release of nitrogen during prolonged periods of time.

15 Claims, 17 Drawing Sheets

(51) Int. Cl.
*C05B 17/00* (2006.01)
*C05G 1/00* (2006.01)

(56) References Cited

U.S. PATENT DOCUMENTS

| | | | | |
|---|---|---|---|---|
| 5,958,977 | A | * 9/1999 | Ikeda | .................... C07C 229/26 |
| | | | | 514/564 |
| 6,776,816 | B1 | 8/2004 | Ringelberg et al. | |
| 8,262,765 | B2 | 9/2012 | Summer et al. | |
| 2004/0035162 | A1 | 2/2004 | Williams et al. | |
| 2010/0035308 | A1 | 2/2010 | Summer et al. | |
| 2011/0252847 | A1* | 10/2011 | Nasholm | ................. C05C 11/00 |
| | | | | 71/11 |

FOREIGN PATENT DOCUMENTS

| | | | |
|---|---|---|---|
| CN | 1093746 C | * | 11/2002 |
| CN | 103086754 A | * | 5/2013 |
| CN | 103086754 A | | 5/2013 |
| CN | 103086772 A | * | 5/2013 |
| CN | 103772069 A | | 5/2014 |
| CN | 104355841 A | | 2/2015 |
| CN | 104774092 A | | 7/2015 |
| CN | 105439739 A | | 3/2016 |
| EP | 0744396 A1 | | 11/1996 |
| WO | 2015/066691 A1 | | 5/2015 |
| WO | 2016/035090 A1 | | 3/2016 |
| WO | 2016/040564 A1 | | 3/2016 |

OTHER PUBLICATIONS

Byju, "Valency Chart", accessed from https://byjus.com/chemistry/periodicity-of-valence-or-oxidation-states-of-elements/ (Year: 2020).*
Steve Butzen ("Micronutrients for Crop Production", 2020, accessed from www.pioneer.com, referenced hereinafter as "Butzen") (Year: 2020).*
McMahon, Mary. "What is Granular Fertilizer". HomeQuestionsAnswered <https://www.homequestionsanswered.com/what-is-granular-fertilizer.htm> (2009) (Year: 2009).*
Nutrient Management. "Competency Area 1: Basic Concepts of Plant Nutrition" <https://nrcca.cals.cornell.edu/soilFertilityCA/CA1/CA1_print.html> Jun. 2014 (Year: 2014).*
Supplementary European Search Report dated Dec. 4, 2019 from corresponding European Application No. 17799771.5.
Official Office Action from corresponding Chinese Application No. 201780029890.0 dated Feb. 1, 2021 and English Translation.
Official Office Action from corresponding Chinese Application No. 201780029890.0 dated Sep. 2, 2021, with English Translation.

* cited by examiner

Figure 5

| Metal salt solution | Precipitation | Appearance of precipitate |
|---|---|---|
| $FeSO_4$ | Yes | Green-grey (light to dark) |
| $FeCl_3$ | Yes | Beige-white |
| $Al_2(SO_4)_3$ | Yes | White |
| $Al_2(SO_4)_3$ + $FeSO_4$ (1:2) | Yes | Yellow-white |
| $MnSO_4$ | Yes | White |
| $CaCl_2$ | Yes | White |
| $K_2SO_4$ | No | - |

Figure 7

| Sample | Composition (in addition to HMP) | Amino acid/HMP ratio in solution | N/P ratio in solution | N/P ratio in precipitate |
|---|---|---|---|---|
| ref | $FeSO_4$ | 0 | 0 | 0.1 |
| E2 | arg + $FeSO_4$ | 3 | 2 | 0.5 |
| E4 | arg + $FeSO_4$ | 12 | 8 | 1 |
| E4:2 | arg + $FeCl_3$ | 12 | 8 | 2.4 |
| A2 | lys + $FeSO_4$ | 12 | 4 | 0.5 |
| A3 | his + $FeSO_4$ | 6 | 3 | 1 |
| M3 | arg + $MnSO_4$ | 6 | 4 | 0.8 |
| M4 | arg + $CaCl_2$ | 6 | 4 | 0.7 |
| M6 | arg + $Al_2(SO_4)_3$ + $FeSO_4$ | 6 | 4 | 0.4 |

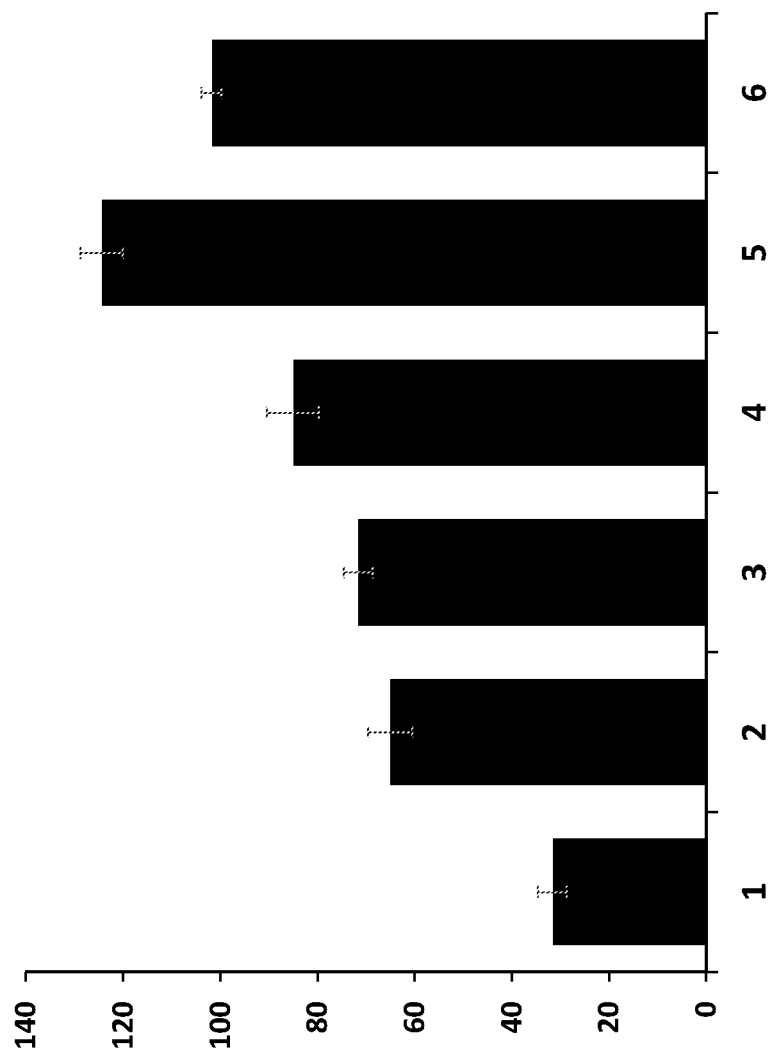

SOLID PHASE FERTILIZER COMPOSITION

TECHNICAL FIELD

The present invention relates to a solid phase fertilizer composition and a method for the preparation thereof. More specifically, the fertilizer composition according to the invention comprises at least one basic L-amino acid based complexed to at least one polyphosphate. In addition, the invention relates to the use of a complex of at least one basic amino acid and at least one polyphosphate to provide slow release of nitrogen to plants.

BACKGROUND

Methods of improving soil and/or growth conditions have in principle been applied since the first days of agriculture and horticulture. Starting with a very limited understanding of mechanisms, it was recognised that the waste from the household animals such as cows improved the growth of crops in the fields. As nitrogen, potassium and phosphorus were identified as the key components required to efficiently fertilize the soil, commercial preparations became widely available and the principle of more is less was generally applied for decades, resulting in the by now well-known over fertilization effects. While preparations including nitrogen, potassium and phosphorus together with various other mineral nutrients still constitute the standard in most plant culture, research is continuously improving with regard to the refinement of fertilizer compositions to provide plants with what is needed for their optimal growth. Specifically designed compositions for certain plants have been developed, and different formats such as liquids and dry preparations are also provided in order to balance a desired growth, feasibility of application and a minimal environmental impact.

One way to decrease the harmful environmental effects of fertilizers, and especially the losses of mineral nutrients to recipient ecosystems, is to develop compositions which provide a slow or delayed release of active component(s). Such compositions are often referred to as controlled-release preparations.

Coating of mineral nutrient salts has been proposed as one way of slowing down release. However, as a common mechanism, coatings will act to delay the release of the enclosed nutrients—in the early stages, the coating will prevent any release of nutrient, and once 'opened' or consumed, the nutrients will all be available at once. Thus, the released nutrients will then either be utilized by the cultured plant, or, if the amount is more than needed, will leak to the environment. Thus, a general challenge with coating technology is to provide for a release which is extended in time, and with a rate suitable for the needs of the cultured plant.

WO 2015/066691 (University of Florida Research Foundation) relates to such slow-release fertilizer compositions wherein graphene oxide films are utilized to delay release. More specifically, the described fertilizer composition comprises a plurality of fertilizer particles and a reduced-graphene oxide layer disposed on the surface of each particle. The fertilizer particles may comprise one or more of nitrogen, phosphorus, potassium, calcium, magnesium and sulphur, boron, chlorine, cupper, iron, manganese, molybdenum, zinc and nickel, wherein at least one is in salt form and can act to reduce graphene oxide. The described coating technology is stated to provide great promise for environmentally-benign controlled-release fertilizers for crop production.

An alternative way of providing for optimised release is to create complexes including the relevant nutrient(s). WO 2016/035090 (Chaudhry) relates to such a fertilizer composition and a process for its preparation. More specifically, a multifunctional organic bio-complexed composition is described, which comprises nutrient sources, such as nitrogen, phosphorus and potassium, and phosphopeptides, such as phosphopeptides comprising a complexation product of organic acids:biocomplexing agent together with a phosphorous source. The bio-complexing agents may be peptides, amino acids or hydrolysed proteins. As compared to conventional fertilizers using nitrogen from urea, which is stated to evaporate quickly, the described complexation of nitrogen to cations is proposed to increase the efficiency.

Further, WO 2016/040564 (Sun Chemical Corporation) relates to a micronutrient fertilizer comprising immediate release as well as sustained release components within a hydrated polyelectrolyte solution. The micronutrients may be selected from a large number of elements, and the polyelectrolyte may be a polymer that has an ionic charge repeated along the polymer. In addition, the composition comprises a metal complexing agent, which may be arginine.

U.S. Pat. No. 8,262,765 (Ajinomoto North America) relates to a method of preparing controlled release fertilizers from fermentation by-products. More specifically, the method may comprise obtaining an amino acid fermentation by-product liquor, adding a phosphate to the amino acid by-product fermentation liquor, adjusting the pH of the liquor and adding a source of magnesium according to '765, not only can magnesium ammonium phosphate be formed by converting a fraction of amino acid fermentation by-product liquors, but it can be formed more efficiently and over a wider pH range than possible with pure systems of ammonium such as ammonium sulphate.

U.S. Pat. No. 6,776,816 (Ringelberg et al) relates to a process for producing forms of magnesium ammonium phosphate e.g. for slow-release fertilizers from animal manure. More specifically, animal excreta is provided; the nitrogen content thereof is determined; a pre-specified amount of at least one magnesium compound is added to yield a first mix, wherein said pre-specified amount is based on said nitrogen content; the pH of said first mix is adjusted to within a pre-specified range of pH to yield a second mix; a pre-specified amount of at least one enzyme is added to said second mix to yield a third mix having a cell structure, wherein said at least one enzyme is mixed with a phosphate buffer to bring the enzyme into solution; said third mix is maintained at a pre-specified temperature range for a pre-specified time; wherein said ammonium magnesium phosphate is precipitated.

Despite the many products and publications related to controlled release of nutrients, there is still a need for improved compositions which provides a greater flexibility in terms of adapting to different plants' different growth requirements, especially in terms of their different needs during different growth cycles.

SUMMARY OF THE INVENTION

One object of the invention is to provide a solid phase fertilizer composition, which provides organic nitrogen to plants during prolonged periods of time.

Another object of the invention is to provide a solid phase fertilizer composition, which provides a low leakage of nitrogen to the environment.

Another object of the invention is to provide a method of preparing a solid phase fertilizer composition from fermentation liquid or a liquidified protein hydrolysate.

These objects and others may be achieved as described in the appended independent claims. Further embodiments, details and advantages of the invention will appear from the dependent claims as well as from the detailed description and experimental part below. All details and embodiments of fertilizer compositions, their preparation and use discussed below are applicable to all of the aspects of the invention.

Definitions

The term "plant" is used herein in a broad sense to denote a species or kind of plant.

The term "amino acid" as used herein includes derivatives or modified forms thereof.

The term "polyphosphate" is used herein in its conventional meaning, i.e. for salts or esters of polymeric oxyanions formed from tetrahedral $PO_4$ (phosphate) structural units linked together by sharing oxygen atoms. Polyphosphates can adopt linear or a cyclic ring structures.

BRIEF DESCRIPTION OF DRAWINGS

FIG. 5 illustrates the use of alternative metal ions for precipitation of salts in order to prepare different fertiliser compositions according to the invention.

FIG. 7 shows a comparison of N/P ratios in different precipitates as determined with XPS.

DETAILED DESCRIPTION OF THE INVENTION

Figure 1:
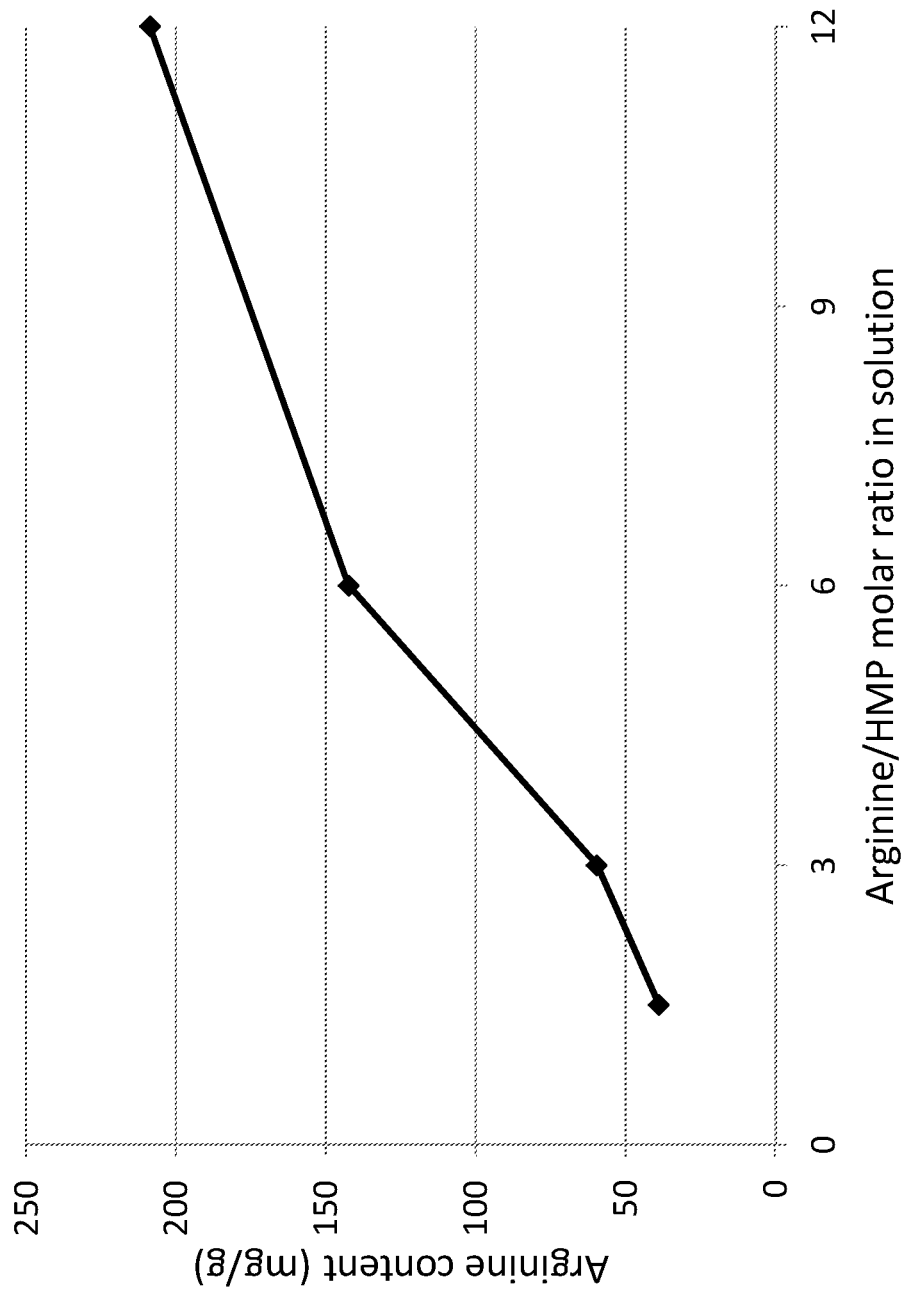
FIG. 1 shows the arginine content in precipitated fertilizer compositions according to the invention as a function of the L-arginine/hexametaphosphate molar ratio in solution.

As appears from the above, the present invention relates to controlled release fertilizer compositions, the basic composition of which can be tuned to suit the many different needs of different plants in different growth cycles and different climates.

In its broadest aspect, the invention is a fertilizer composition comprising nitrogen and phosphorus, which comprises complexes of at least one basic L-amino acid and at least one polyphosphate. The fertilizer composition may be a liquid or a solid phase fertilizer.

The solid phase fertilizer may comprise at least one basic amino acid complexed to polyphosphate. The complex is conveniently precipitated by the addition of metal ions to a solution comprising at least one complex, resulting in a precipitate of solid phase fertilizer composition which also comprises such metal. The complexing of the organic nitrogen provided by the invention appears to delay its release of nitrogen to a rate corresponding to the need of the fertilized plant, whereby nitrogen leakage to the environment is reduced or even eliminated.

Thus, a first aspect of the invention is a solid phase fertilizer composition comprising nitrogen and phosphorus, wherein nitrogen is provided by at least one basic L-amino acid which has been complexed to polyphosphate in solution and precipitated with multivalent metal ion(s).

The basic L-amino acid may be L-arginine; L-lysine; or L-histidine. In one embodiment, the basic L-amino acid is L-arginine and/or L-lysine. In this context, it is to be understood that the amino acids used in the present invention may include modified forms of basic L-amino acids, provided that they have maintained the herein discussed properties of complexing with polyphosphates by multivalent metal ions and being released to provide organic nitrogen to soil. Basic L-amino acids are available from commercial sources.

The solid phase fertilizer may include a mixture of basic L-amino acids. As will be discussed in more detail below, the nature and amount of amino acid(s) is one of the parameters that are used according to the invention to optimise the specific contents of a fertilizer composition for a specific plant and/or growth condition.

The multivalent metal ion may be any multivalent metal ion capable of precipitating a complex of at least one basic L-amino acid and polyphosphate. In one embodiment, the multivalent metal ion is an alkaline earth metal, such as calcium; a transition metal, such as iron or manganese; or a post-transition metal, such as Al. In a specific embodiment, the multivalent metal ion is selected from the group consisting of Fe(II), Fe(III) and Ca(II). Suitable multivalent metal ions are available from commercial sources.

In one embodiment of the fertilizer composition according to the invention, the Fe(II) or Fe(III) was used to precipitate the solid phase fertilizer.

The multivalent metal ion(s) is another parameter which may be used according to the invention to optimise the specific contents of a fertilizer composition for a specific plant and/or growth condition.

The polyphosphate present in the fertilizer composition according to the invention may be of any size and structure capable of complexing with a basic L-amino acid. In one embodiment of the fertilizer composition, the number of phosphorous atoms in the polyphosphate is at least or equal to two. In another embodiment, the number of phosphorous atoms in the polyphosphate is at least or equal to about six, such as six. In a further embodiment, the number of phosphorous atoms in the polyphosphate is at least or equal to about 700, such as 700. In an additional embodiment, the number of phosphorous atoms in the polyphosphate is at least or equal to about 1000 or about 2000, such as 1000 or 2000.

Thus, the number of phosphorous atoms in the polyphosphate may be in a range of 2-700, such as about 2-6; 6-50; 50-500 or 50-700, e.g. 500-700.

Larger phosphates may alternatively or additionally be used, in which case the number of phosphorous atoms in the polyphosphate is in the range of 500-2000, such as 700-2000, 700-1000 or 700-10000, e.g. 1000-10000.

As the skilled person will appreciate, the endpoints of the herein given intervals may vary with one or a small number of P atoms, and should not be interpreted as exact unless specifically expressed so. It would appear that the longer the polyphosphates are, the larger the variation of the endpoint may result in similar growth results.

Alternatively, the fertilizer composition according to the invention may be described by its ratio between nitrogen originating from basic L-amino acid(s) and phosphorous. Thus, the N:P ratio may be at least about 2:1; such as about 4:1. In one embodiment, the N:P ratio is about 8:1.

It should be noted that the number of L-arginine molecules are likely to be the same number as the number of phosphorous atoms in the polyphosphate. For example L-arginine-diP have two molecules L-arginine and two phosphorous atoms and L-arginine hexametaP have six molecules L-arginine and six phosphorous atoms in the phosphate complex. Thus an arginine polyphosphate molecule with 10000 phosphates may comprise 10000 arginine molecules.

As the skilled person will appreciate, the contents of a solid phase fertilizer composition according to the invention may be analysed using routine methods. Thus, elemental analysis may be used to convert the ratios given above to percentages, and commonly used standard methods for total nitrogen and phosphorous determination may be applied to a fertilizer composition to define its contents.

As mentioned above, the structure of the polyphosphate may be one of many, such as linear or cyclic forms, or a mixture of linear and cyclic forms. Polyphosphates useful in the fertilizer compositions according to the invention may include substituents or additional groups, as long as their capability of complexing a basic L-amino acid which can be precipitated with a multivalent metal ion is not impaired.

The size and structure of the polyphosphate is an additional parameter which may be used according to the invention to optimise the specific contents of a fertilizer composition for a specific plant and/or growth condition.

Thus, the solid phase fertilizer composition according to the invention may be tuned to be particularly suitable for a slowly growing plant, such as a tree e.g. pine, or a fast growing plant, such as lettuce. As the skilled person will appreciate, other factors to consider when optimising the availability of nutrient from a fertilizer composition will be the desired growth rate, light and soil, etc.

The present inventors have surprisingly found that by providing organic nitrogen to plants via a precipitated phosphorous complex, the rate of nitrogen uptake can be extended in time or delayed by adjusting the chemical structure and contents of the complex. For example, by using a longer or larger polyphosphate, the availability of nitrogen to a certain plant may be delayed and/or prolonged in action, as a slower release may be provided. This is an advantageous difference from many prior art coated fertilizer composition, the action of which is delayed until the coating is consumed or removed, at which point the full nutrient content is made available at once, often resulting in substantial leakage of nitrogen to the environment. As is well known, additional nutrients to phosphorous and nitrogen are required for growth of a plant. Thus, the first aspect of the invention also includes a fertilizer preparation, which comprises a solid phase fertilizer composition as described above together with other macronutrient(s) such as potassium and/or micronutrient(s) in addition to the basic L-amino acid polyphosphate metal precipitate.

In one embodiment, the fertilizer preparation comprises a combination of two or more differently composed fertilizer compositions according to the invention.

A fertiliser preparation according to the invention may be presented in any conventional fertilizer format. Thus, in one embodiment, the fertilizer preparation is in particulate or granular form.

A second aspect of the invention is a method of preparing a solid phase fertilizer composition, which method allows for the design of controlled-release fertilizer compositions specifically for desired conditions of nitrogen release. In one embodiment, the method is for the preparation of a solid phase fertilizer composition as discussed above, in any one of its embodiments.

The liquid may be any aqueous liquid capable of dissolving the below-discussed amino acids, such as water. Preparation of solid phase fertilizer compositions from water solutions will be described in detail in the experimental part below.

In one embodiment, the liquid is comprises fermentation liquid. Such liquid may for example be a by-product of fermentation, in which case the present invention provides an advantageous use of otherwise discarded products thereby avoiding uncontrolled release of nitrogen to the environment.

In an alternative embodiment, the liquid is a liquidified protein hydrolysate. Suitable protein hydrolysates are commercially available and commonly used as undefined growth media.

In one embodiment of the present method, the basic L-amino acid is L-arginine and/or L-lysine. As discussed above in relation to the first aspect of the invention, such amino acids may be in modified and/or substituted forms, provided they are capable of providing the herein discussed effects Amino acids are available from commercial sources.

As the skilled person will appreciate, pH adjustment may be required before addition of the phosphate source, depending on the nature of the liquid and other parameters.

In one embodiment of the method, the polyphosphate source is a phosphate powder dissolved in water, wherein the pH suitably is close to that of the liquid comprising at least one basic L-amino acid. The skilled person will be able to define a suitable phosphate starting material which together with the appropriate tuning of the other components, amounts and conditions will provide a fertiliser composition with desired properties of nitrogen release. As the skilled person will appreciate, the actual growth properties of candidate compositions are suitably confirmed by routine experimentation.

The phosphate solution may be added to the amino acid solution under stirring, and the resulting solution is conveniently left to settle, for example at room temperature.

At least one multivalent metal ion is then added in order to precipitate the complex formed between amino acid and phosphate. The multivalent metal ion may be any multivalent metal ion capable of precipitating a complex of at least one basic L-amino acid and polyphosphate. In one embodiment, the multivalent metal ion is an alkaline earth metal, such as calcium; a transition metal, such as iron or manganese; or a post-transition metal, such as Al. In a specific embodiment, the multivalent metal ion is selected from the group consisting of Fe(II), Fe(III) and Ca(II). Suitable multivalent metal ions are available from commercial sources.

After completed precipitation, the supernatant may be decanted and the remaining slurry centrifuged. The resulting solid material may be collected and dried before any further, optional steps to make a preparation including combination with further components and/or specific formatting such as granulation.

A third aspect of the invention is the use of a complex formed of at least one polyphosphate and at least one basic L-amino acid to supply nitrogen to plants. Thus, this aspect is a method of using a complex formed of at least one polyphosphate and at least one basic L-amino acid for the supply of nitrogen to plants. One embodiment of this aspect uses of a solid phase fertilizer composition as discussed above, in any one of its embodiments.

In one embodiment, the period of time for supply of nitrogen from the complex is prolonged as compared to the supply of the same amount of non-complexed nitrogen and phosphorous under otherwise equivalent conditions.

In one embodiment of the present use, the nitrogen is supplied to a plant selected from the group consisting of trees, grasses, vegetables and crops.

In one embodiment of the present use, the basic L-amino acid is L-arginine and/or L-lysine.

In one embodiment of the present use, the metal ion(s) are selected from the group consisting of Fe(II), Fe(III), and Ca(II).

In one embodiment of the present use, the number of phosphorous atoms in the polyphosphate is at least or equal to two phosphates.

In one embodiment of the present use, the number of phosphorous atoms in the polyphosphate is at least or equal to six phosphates.

In one embodiment of the present use, the number of phosphorous atoms in the polyphosphate is at least or equal to 700 phosphates.

DETAILED DESCRIPTION OF DRAWINGS

FIG. 1 shows the arginine content in precipitated fertilizer compositions according to the invention as a function of the L-arginine/hexametaphosphate molar ratio in solution. In FIG. 1, HMP is abbreviation for hexametaphosphate. The compositions were prepared as described in the Example 2 below. As appears from the figure, the L-arginine content in the composition increases linearly when the relative amount of arginine in the solution from which complexes are formed and precipitated increases. Thus, a large excess of arginine compared to hexametaphosphate in the solution results in higher arginine content in the final precipitated complex.

Figure 2:
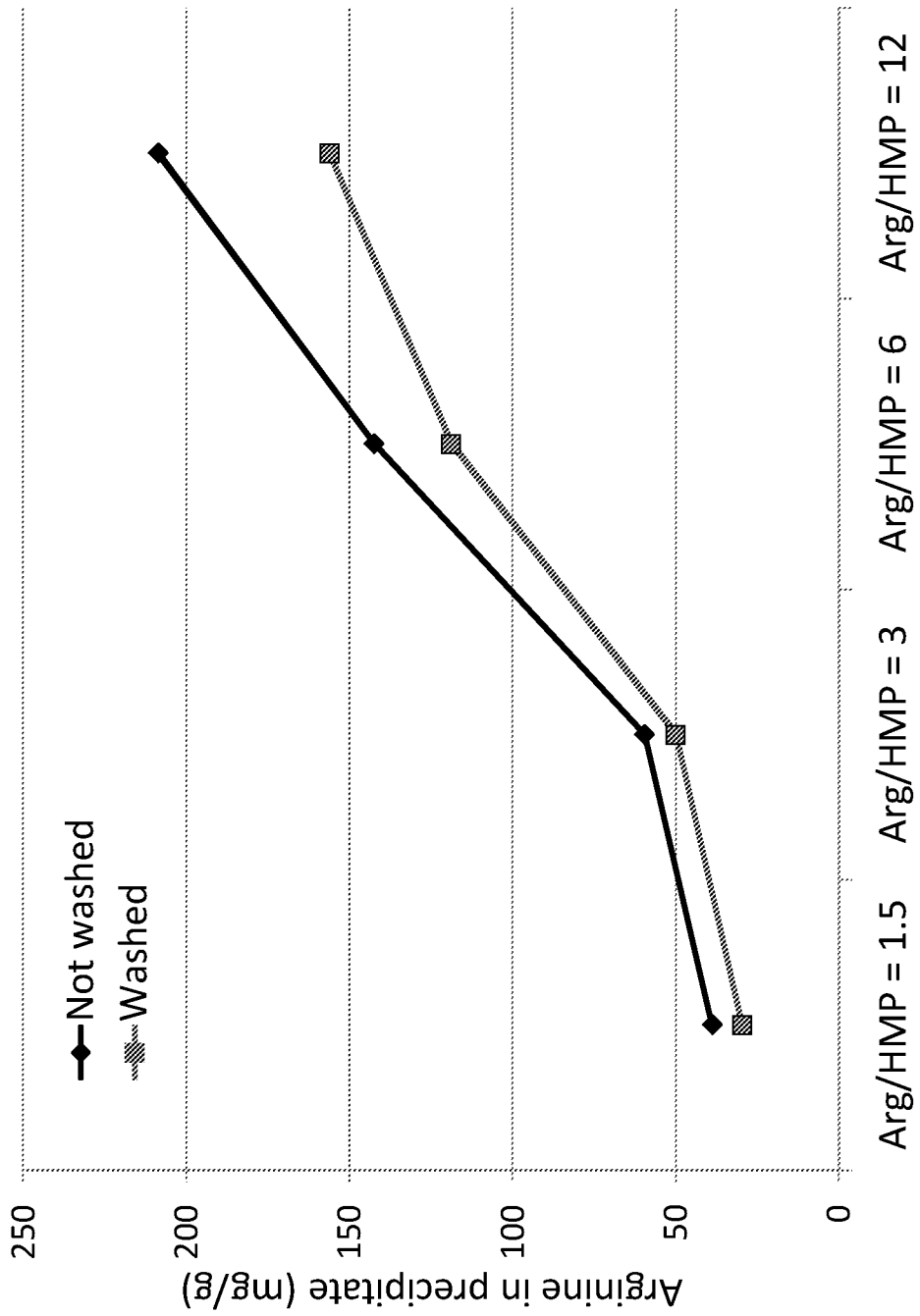
FIG. 2 shows the arginine content in precipitated fertilizer compositions according to the invention before and after washing in water.

FIG. 2 shows the arginine content in precipitated fertilizer compositions according to the invention before and after washing in water. As appears from this figure, the arginine content is slightly lower after washing. This suggests that during precipitation, some of the free arginine in solution will adsorb to the surface of the precipitate particles. The major part of the arginine is however retained in the precipitate and not released during washing in water.

Figure 3:
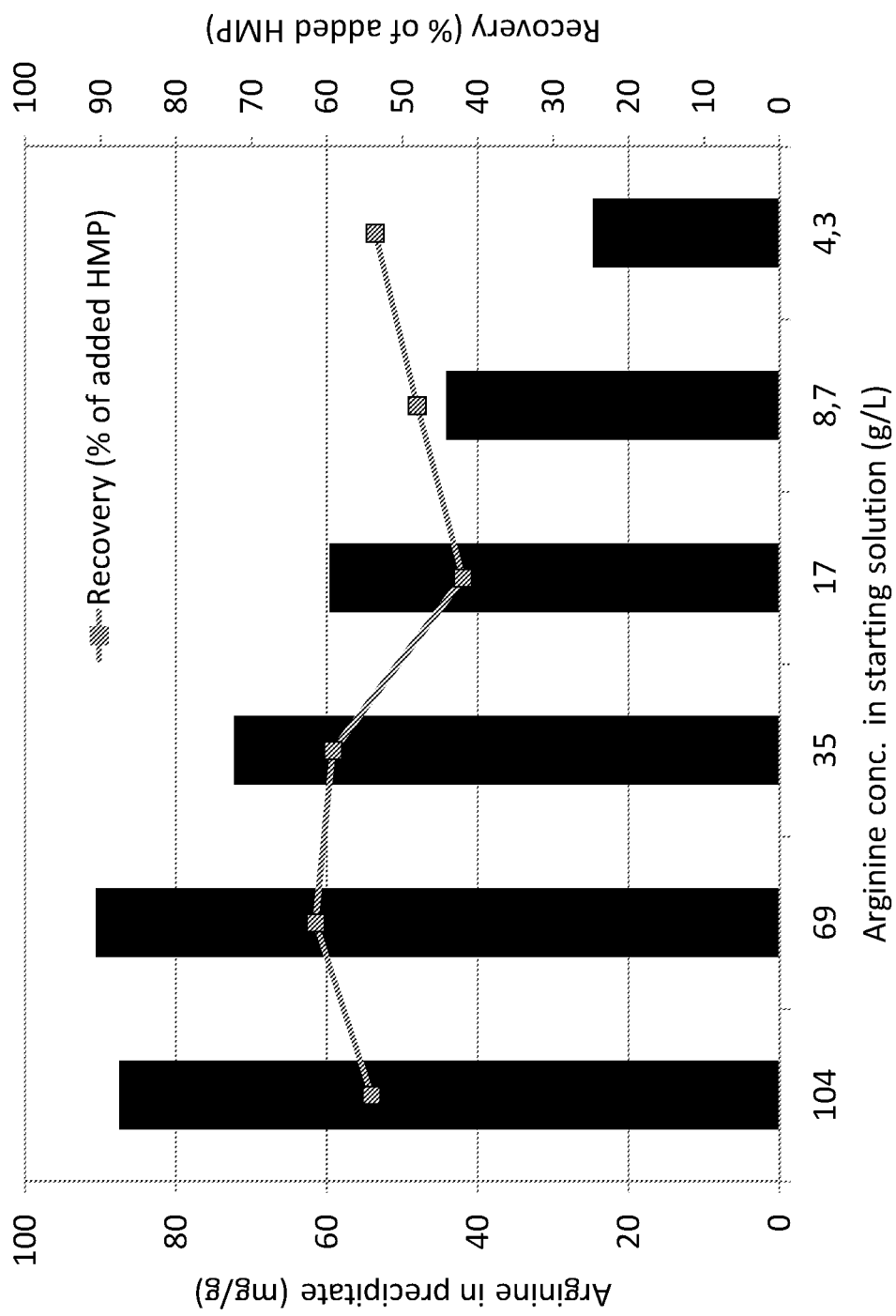
FIG. 3 shows how the arginine content in the precipitates decreases when the arginine concentration in the starting solution is reduced.

FIG. 3 shows how the arginine content in the precipitates decreases when the arginine concentration in the starting solution is reduced. The relative ratio of arginine to hexametaphosphate was constant throughout all experiments (Example 3). However, the amount of recovered precipitate remains relatively constant regardless of the starting arginine concentration.

Figure 4:
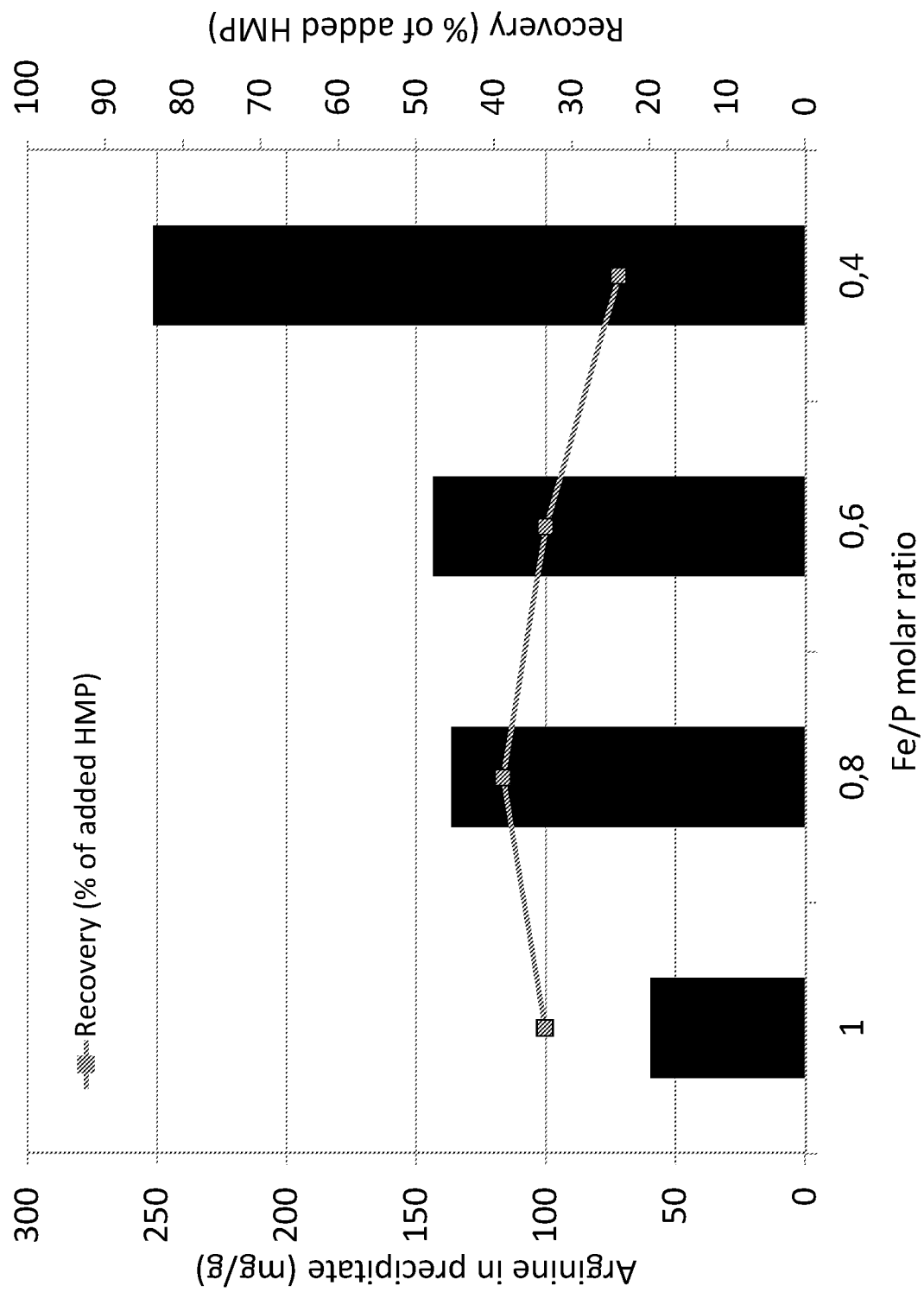
FIG. 4 shows how the amount of ferrous ion added to the arginine-hexametaphosphate solution affects the arginine content in the precipitate.

FIG. 4 shows how the amount of ferrous ion added to the arginine-hexametaphosphate solution affects the arginine content in the precipitate (Example 4). When the molar amount of ferrous ions is equal to the amount of phosphorous atoms present, approximately 50 mg/g arginine is present in the precipitate. When the amount of ferrous ions is reduced, the arginine content increases significantly. The association between arginine and hexametaphosphate most probably occurs through a combination of ionic association and hydrogen bonding, and metal cations added as a precipitant will compete with arginine for the binding sites on the hexametaphosphate molecules. By reducing the amount of ferrous ions in the precipitation step, a more arginine rich precipitate was obtained with only a slight decrease in precipitate recovery.

FIG. 5 illustrates the use of alternative metal ions for precipitation of salts in order to prepare different fertiliser compositions according to the invention (Example 5). Examples of formation and appearance of arginine-hexametaphosphate precipitate using different metal salt solutions as the precipitating agent are shown. Precipitates have been obtained for several di- and trivalent cations. Monovalent metal ions are not expected to form insoluble species and no precipitation was observed when potassium sulphate was added as the precipitating agent.

Figure 6:
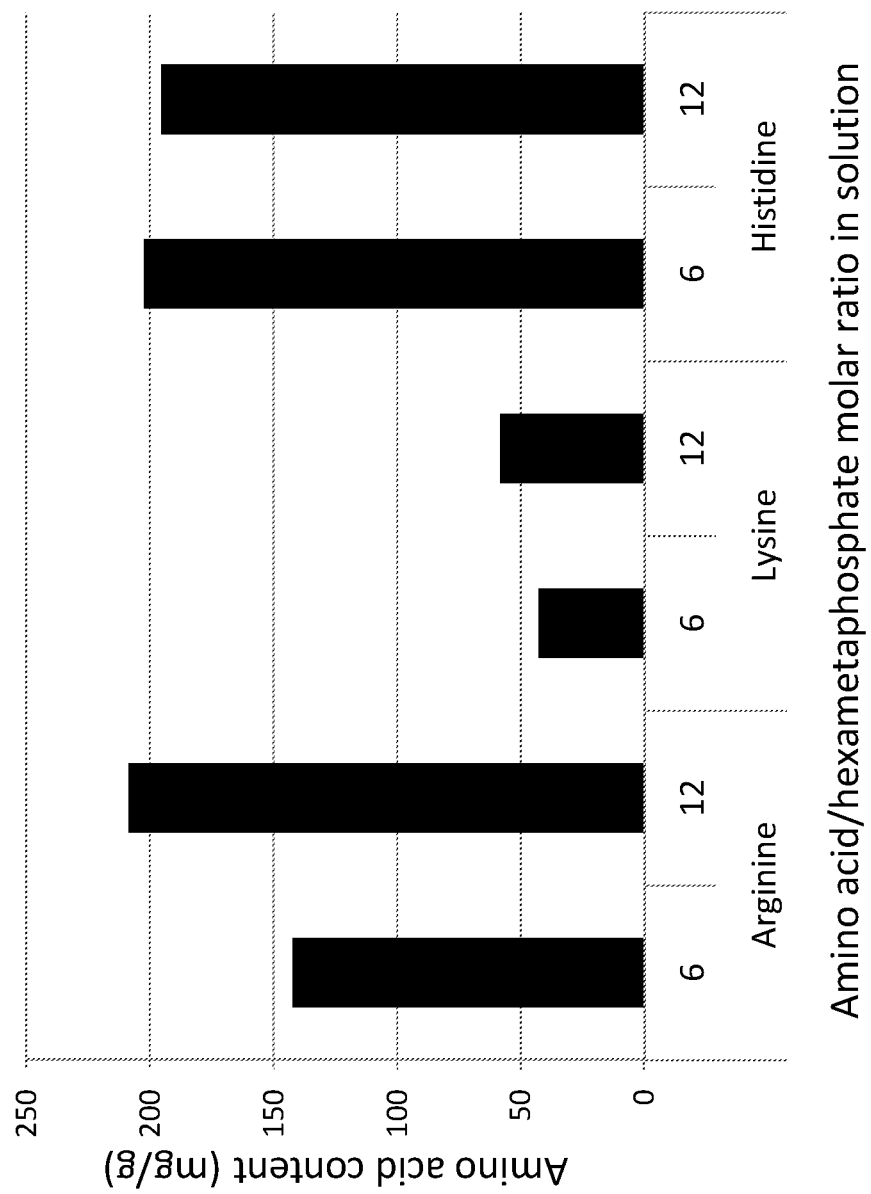
FIG. 6 shows the amino acid content in precipitated fertilizer compositions according to the invention for L-arginine as well as the other basic amino acids as a function of the amino acid/hexametaphosphate molar ratio in solution.

FIG. 6 shows similar to FIG. 1 the amino acid content in precipitated fertilizer compositions according to the invention for L-arginine as well as the other basic amino acids L-lysine and L-histidine as a function of the amino acid/hexametaphosphate molar ratio in solution. All experiments were carried out according to the example 6 below. As appears from this figure, all three basic amino acids are capable of forming amino acid-hexametaphosphate complexes. The complex including histidine has an amino acid content comparable to that of the arginine complex, while lysine results in a lower arginine content in the precipitate. The difference in amino acid content is likely related to the interaction strength between the individual amino acid and the hexametaphosphate molecule.

FIG. 7 shows a comparison of N/P ratios in different precipitates prepared according to Example 2-6 above as determined with XPS. The N/P ratio in the starting solution is shown for comparison. Depending on the choice of the experimental variables, the final N/P ratio in the fertilizer composition can be controlled. By exploiting the findings from the different examples, a broader range of N/P ratios of the precipitates can be obtained.

Figure 8:
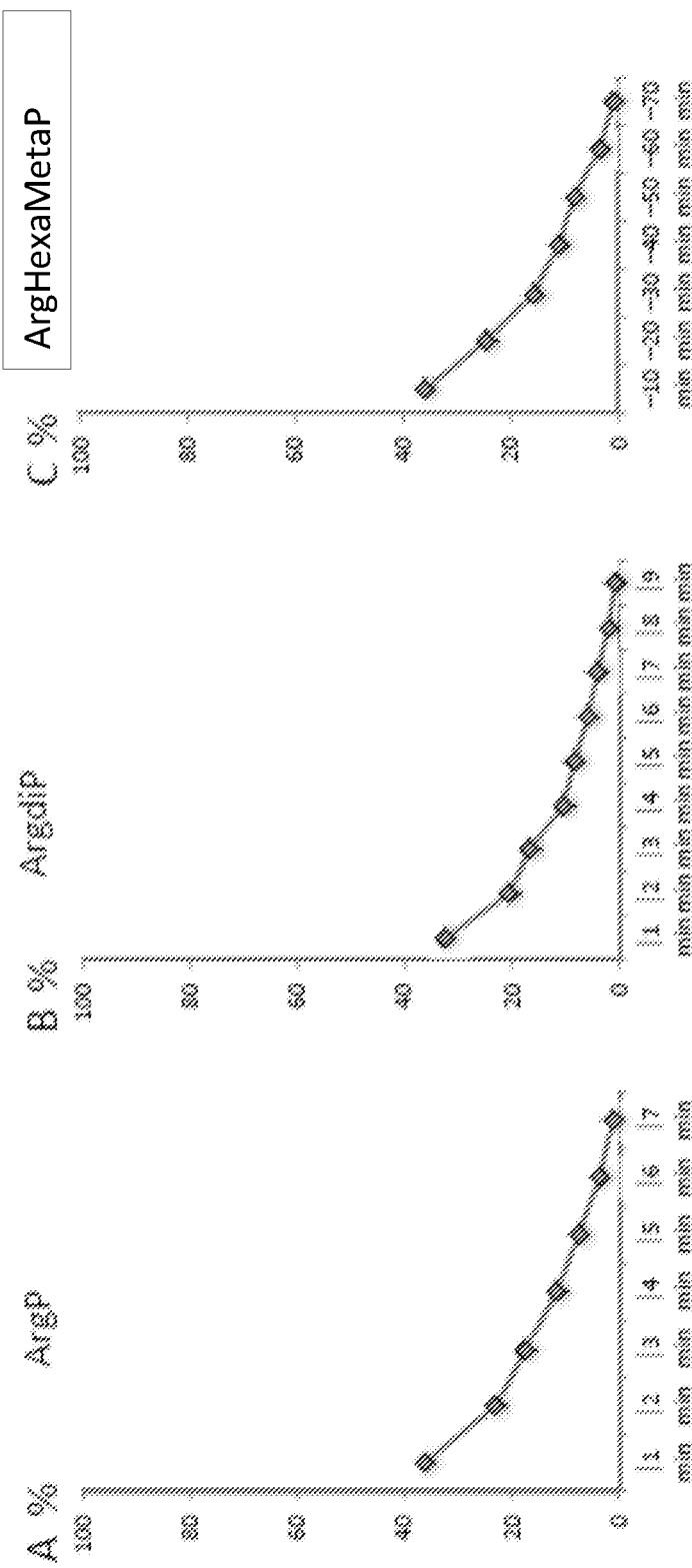
FIG. 8 A-C shows the solubility of arginine complexes including polyphosphates of different chain lengths.

FIG. 8 shows the solubility of arginine complexes. To 100 mg complex 10 mL $dH_2O$ was added and left to rotate in a rotator mixer at 15 rpm. The supernatant was collected. This was repeated seven times. Extracted supernatants were analysed by UPLC and the concentration of arginine plotted as wt % of total complex. The results appear from FIGS. 8A-C, wherein FIG. 8A is ArgP extracted with $H_2O$ at 1 min intervals; FIG. 8B is ArgPP extracted with $H_2O$ at 1 min intervals; and FIG. 8C is ArgHexaMetaP extracted with $H_2O$ at 10 min intervals. Thus, these figures show that an increased phosphate chain length also leads to decreased solubility of the complexes. For ArgP the complex was dissolved completely after 7 minutes compared to the ArgHexaMetaP complex which was dissolved after 70 minutes.

Figure 9:
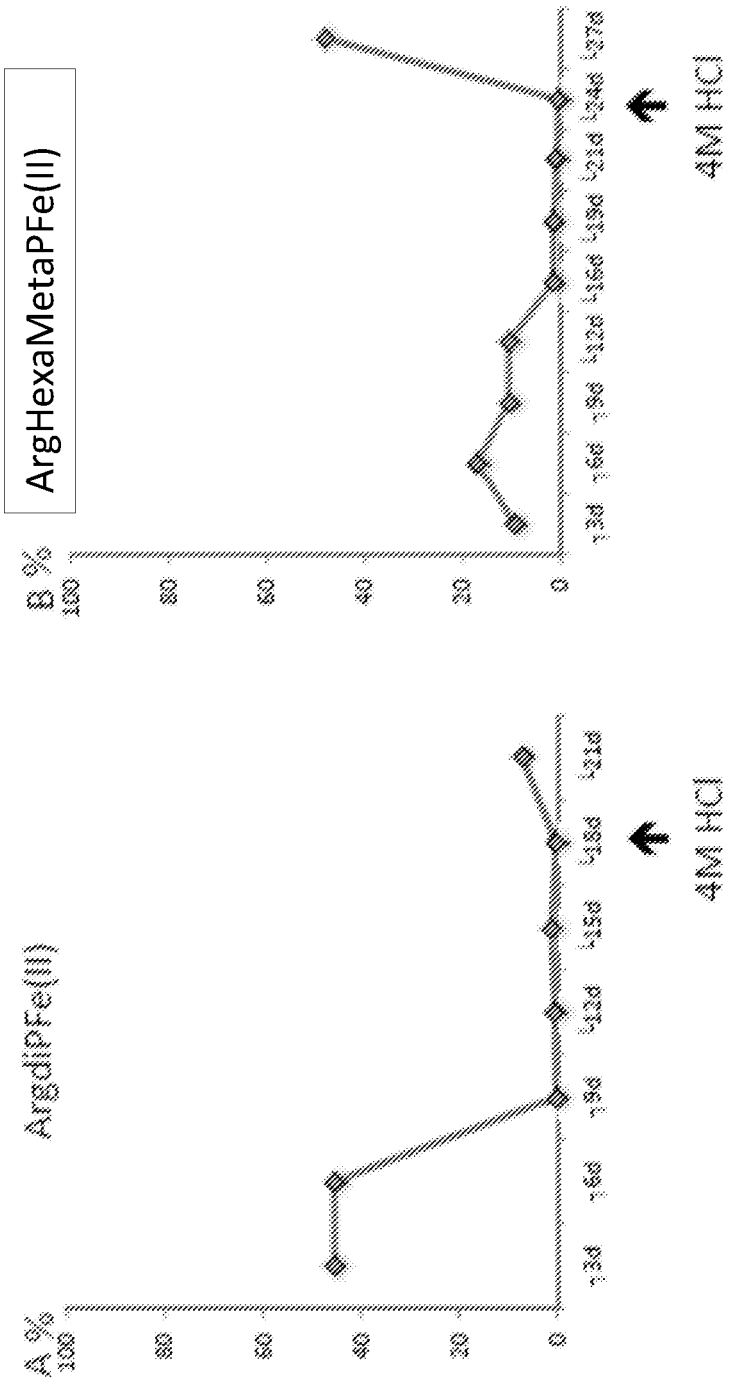
FIG. 9A-B shows the solubility of ArgdiPFe(II) and ArgHexaMetaFe(II), respectively.

FIG. 9 shows the solubility of arginine complexes with bound Fe(II). To 100 mg complex 10 mL $dH_2O$ was added and left to rotate in a rotator mixer at 15 rpm. The supernatant was collected. This was repeated seven times for the ArgdiPFe(II) and eight times for the ArgHexaMetaFe(II) complex. At the last time point 4M HCl was added to dissolve the remaining complex. Extracted supernatants were analysed by UPLC and the concentration of arginine plotted as wt % of total complex. The results appear from FIGS. 9A-B, wherein FIG. 9A is ArgdiPFe(II) extracted with $H_2O$ with 3 days intervals and FIG. 9B is ArgHexaMetaFe(II) extracted with $H_2O$ with 3 days intervals. Thus, with the addition of Fe(II) there is a drastic reduction in the solubility of the complexes from minutes to weeks. At the last time point 4M HCl was added to dissolve the remaining complex ArgHexaMetaP contained more than 50% of arginine still bound in the complex at the last time point at 24 days compared to ArgdiP where only 10% of the arginine remained after 21 days. Depending on the type of polyphosphate chain there is an effect on solubility of the complex.

Figure 10:
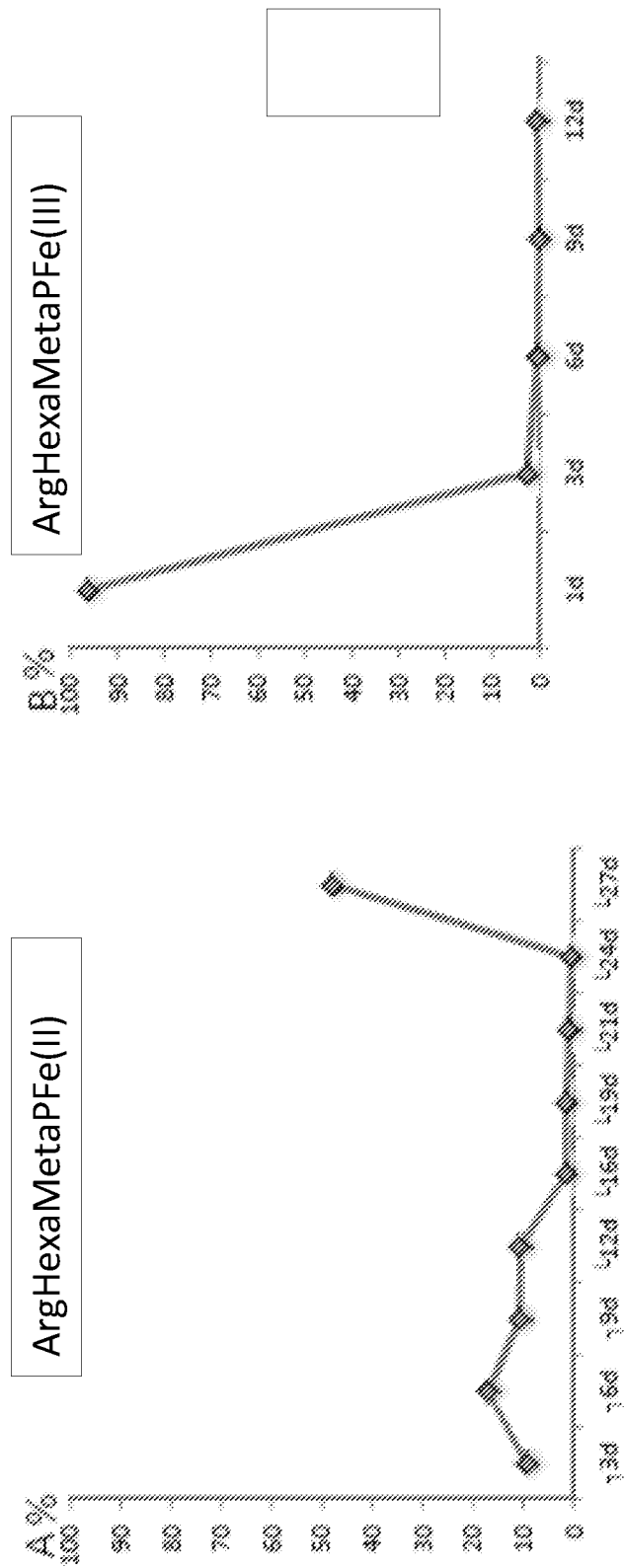
FIG. 10A-B shows the solubility of arginine hexametaphosphate complexes including Fe(II) or Fe(III).

FIG. 10 shows the solubility of arginine complexes with bound Fe(II) or Fe(III). To 100 mg complex 10 mL $dH_2O$ was added and left to rotate in a rotator mixer at 15 rpm. The supernatant was collected. This was repeated five times for the Fe(III) complex and nine times for the Fe(II) complex. At the last time point 4M HCl was added to the Fe(II) complex to dissolve the remaining complex. Extracted supernatants were analysed by UPLC and the concentration of arginine plotted as wt % of total complex. The results appear from FIGS. 10A-B, wherein FIG. 10A shows ArgHexaMetaPFe(II) extracted with $H_2O$ with 3 days intervals; and FIG. 10B shows ArgHexaMetaPFe(III) extracted with $H_2O$ with 3 days intervals. Thus, the form of Fe (II or III) has a marked effect on the solubility of the complex. The Fe(III) complex was completely dissolved after 6 days compared to the Fe(II) complex that had more than 50% arginine left after 27 days.

Figure 11:
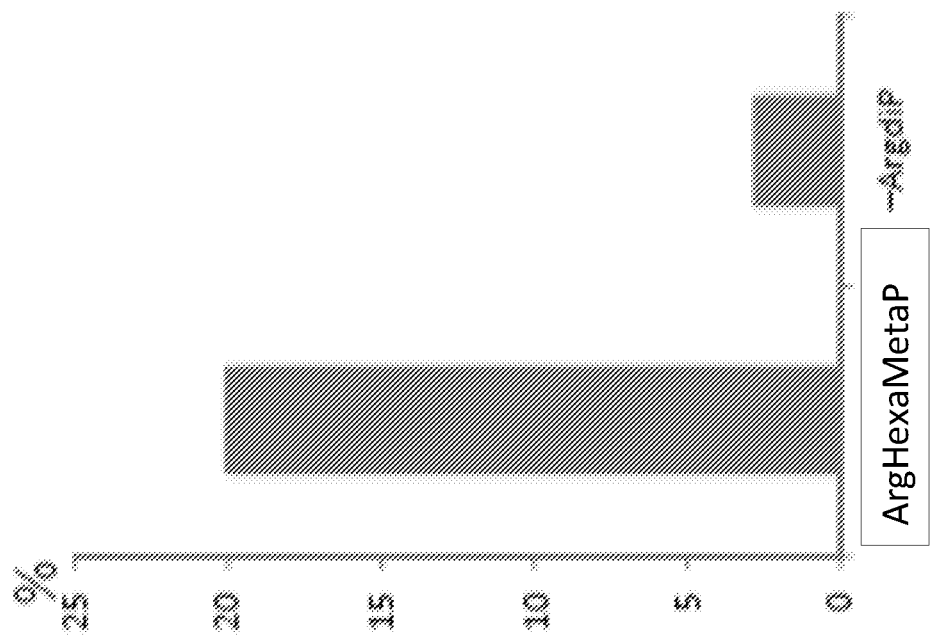
FIG. 11 shows how the amount of arginine in the different argP complexes is dependent on phosphate chain length.

FIG. 11 shows that the amount of arginine in the different argP complexes is dependent on phosphate chain length. 100 mg ArgHexaMetaP and ArgdiP was dissolved in 5 mL 4M HCl and the arginine content was analysed by UPLC. The arginine content was plotted as wt % of total complex. A longer polyphosphate chain length leads to increased arginine content in the complex.

Figure 12:
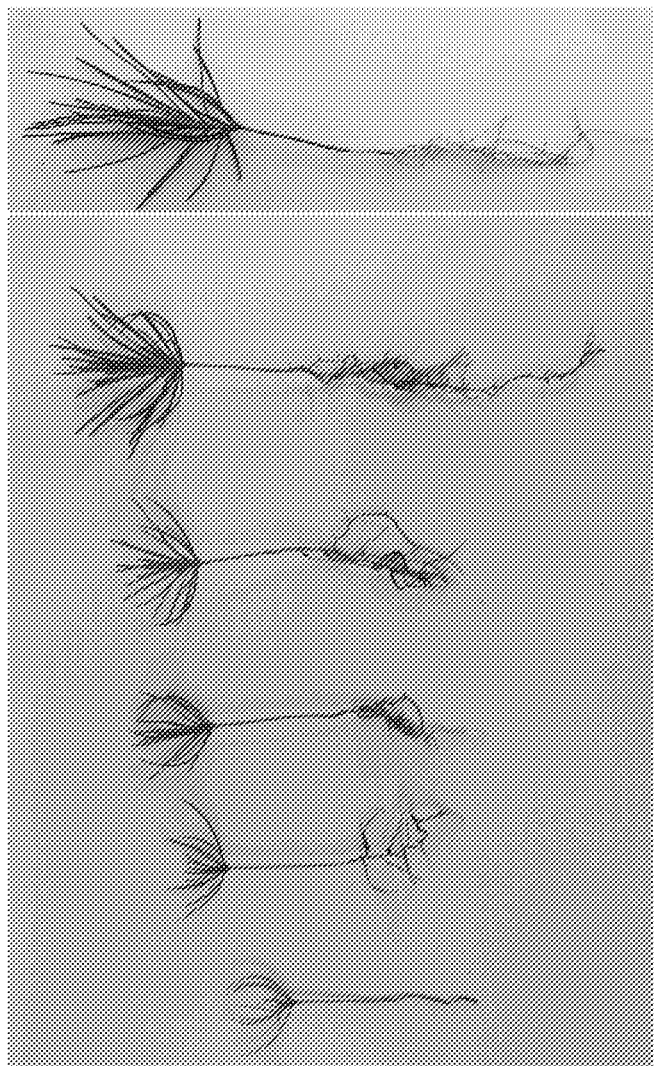
FIG. 12A-C shows the effect of germination and growth of pine with different types of arginine phosphate complexes, as described in more detail below.

FIG. 12 shows the effect of germination and growth with different types of arginine phosphate complexes. 20 mg nitrogen in the form of different arginine phosphate complexes was incorporated in to peat and the effect on germination and growth was studied. The results appear from FIGS. 12A-C, where 12A shows the germination of pine seedlings fertilized with 20 mg of N in different types of ArgP complexes (%); 12B shows the dry weight of pine seedlings fertilized with 20 mg of N in different types of ArgP complexes; and 12C shows pine seedlings fertilized with 20 mg of N in different types of ArgP complexes. More specifically, in FIG. 12C: 1 is Arg-HCl; 2 is ArgP; 3 is ArgPP; 4 is ArgHexaMetaP; 5 is ArgHexaMetaPFe(II); and 6 is Arg-P10000. Thus, FIG. 12 illustrates how the solubility of the different argP complexes affects growth and germination of pine seedlings. More rapidly dissolving forms of argP complexes lead to reduced germination and decreased growth of the seedlings, probably as a result of nitrogen toxicity.

FIG. 13A-B show the effect of different arginine-polyphosphate complexes on the growth of lettuce. Lettuce is a relatively fast growing plant, which would explain why no difference is noted in the results from differently sized polyphosphates.

Figure 14A:
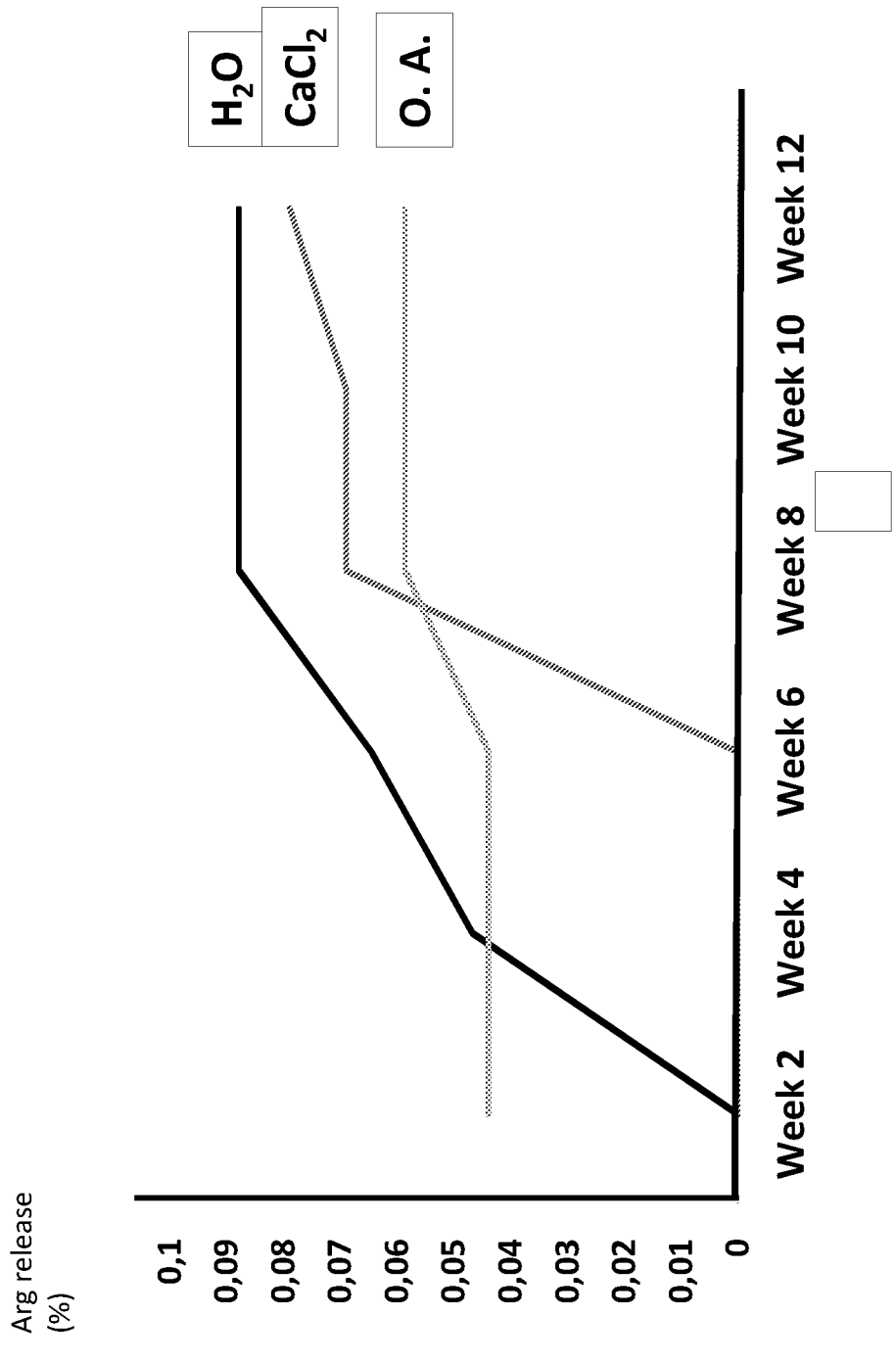
FIG. 14A-B illustrate the stability of arginine polyphosphate with a chain length of approximately 10000 phosphorus atoms, prepared as described in Example 9.
Figure 14B:
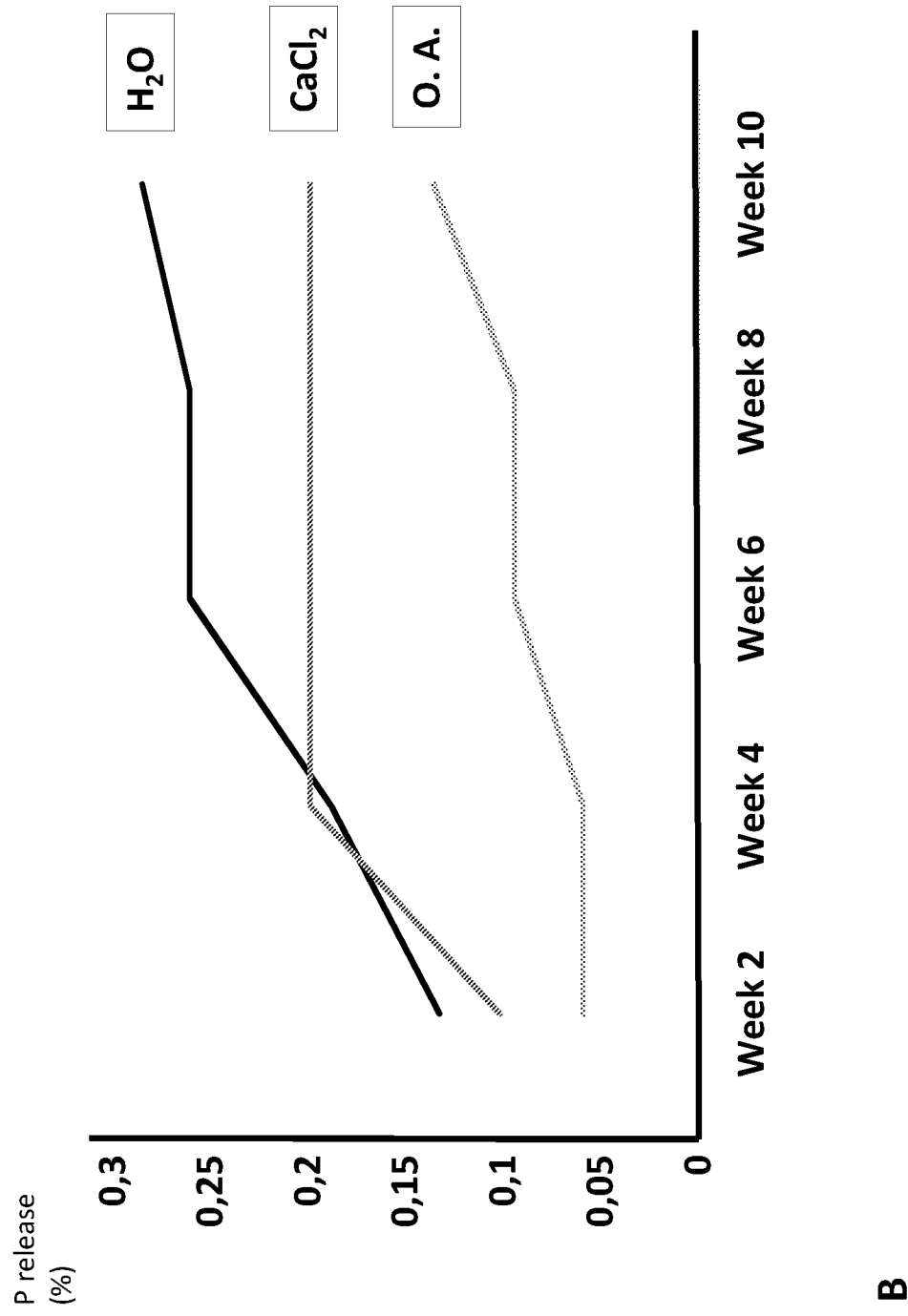

FIG. 14A-B illustrate the stability of arginine polyphosphate with a chain length of approximately 10000 phosphorus atoms, prepared as described in Example 9. More specifically, FIG. 14A shows the release of arginine with time; while FIG. 14B shows the release of phosphorous with time, both figures illustrating how a slow release with time may be obtained from fertilizer compositions according to the invention wherein the phosphate chain is long. Thus, the results shows the advantage of versatility of the present invention, enabling the preparation of a fertilizer composition which is adapted for specific growth needs depending e.g. on the plant and/or the contents of the soil in which it is cultured.

EXPERIMENTAL PART

The present examples are provided for illustrative purposes only, and should not be perceived as limiting the invention as defined by the appended claims. All references cited below and elsewhere in the present application are hereby included herein via reference.

Example 1: General Method for Preparing Arginine-Hexametaphosphate-Iron Complex

An arginine solution was prepared by dissolving arginine base (Sigma) in purified water to a concentration of 0.5 M. The pH of the solution was adjusted to 8.3 with concentrated hydrochloric acid. A 0.5 M solution of sodium hexametaphosphate was prepared by dissolving the phosphate powder in purified water and adjusting the pH of the solution to 8.3 with a 50% (w/w) sodium hydroxide solution. The sodium hexametaphosphate solution was slowly added to the arginine solution under continuous stirring. The resulting solution was stirred at room temperature for 4 hours. To precipitate the arginine-phosphate complex, a solution containing either ferrous or ferric ions was prepared ($FeSO_4$ or $FeCl_3$). The iron salt solution was slowly added to the arginine-phosphate solution which resulted in precipitation of a solid material. The precipitate was left overnight to allow for the precipitate to settle. The supernatant was decanted and the remaining slurry was centrifuged. The resulting solid material was collected and dried in a furnace at 60° C.

Example 2

According to the general method described in example 1, compositions with different molar ratio of arginine and hexametaphosphate were prepared. The concentrations of the solutions were kept constant and the amount of HMP was reduced to obtain the chosen arginine/HMP molar ratio according to table 1 below.

TABLE 1

| Experiment | Arginine/HMP (molar ratio) | Arginine (mL) | HMP (mL) | 0.6M $FeSO_4$ (mL) |
| --- | --- | --- | --- | --- |
| E1 | 1.5 | 30 | 20 | 100 |
| E2 | 3 | 36 | 12 | 60 |
| E3 | 6 | 42 | 7 | 35 |
| E4 | 12 | 48 | 4 | 20 |

Example 3

According to the general method described in example 1, arginine solutions with different concentrations were used according to table 2 below.

TABLE 2

| Experiment | Arginine/HMP (molar ratio) | Arginine conc. (g/L) | Arginine (mL) | HMP (mL) | 0.5M FeSO$_4$ (mL) |
|---|---|---|---|---|---|
| S1 | 6 | 104 | 50 | 10.0 | 60 |
| S2 | 6 | 69 | 50 | 6.67 | 40 |
| S3 | 6 | 35 | 50 | 3.33 | 20 |
| S4 | 6 | 17 | 50 | 1.67 | 10 |
| S5 | 6 | 8.7 | 50 | 0.83 | 5 |
| S6 | 6 | 4.3 | 50 | 0.42 | 2.5 |

Example 4

According to the general method described in example 1, different amounts of FeSO$_4$ solution was added to the arginine-hexametaphosphate complex solutions according to table 3 below.

TABLE 3

| Experiment | Arginine/H (MP molar ratio) | HMP (ml) | Arginine (mL) | 0.5M FeSO$_4$ (mL) | Fe/P (molar ratio) |
|---|---|---|---|---|---|
| F1 | 6 | 8.3 | 50 | 50 | 1 |
| F2 | 6 | 8.3 | 50 | 40 | 0.8 |
| F3 | 6 | 8.3 | 50 | 30 | 0.6 |
| F4 | 6 | 8.3 | 50 | 20 | 0.4 |

Example 5

According to the general method described in example 1, different metal salt solutions were used to precipitate the arginine-hexametaphosphate complex according to table 4 below.

TABLE 4

| Exp. | Metal salt | Arginine/H (MP molar ratio) | Amino acid (M) | Amino acid (mL) | HMP (mL) | Metal salt (M) | Metal salt (mL) |
|---|---|---|---|---|---|---|---|
| ref | FeSO$_4$ | 0 | — | 0 | 8.3 | 0.5 | 50 |
| E2 | FeSO$_4$ | 3 | 0.5 | 36 | 12 | 0.6 | 60 |
| E4 | FeSO$_4$ | 12 | 0.5 | 48 | 4 | 0.6 | 20 |
| E4:2 | FeCl$_3$ | 12 | 0.5 | 48 | 4 | 1 | 12 |
| M3 | MnSO$_4$ | 6 | 0.5 | 50 | 8.3 | 1 | 50 |
| M4 | CaCl$_2$ | 6 | 0.5 | 50 | 8.3 | 1 | 50 |
| M6 | Al$_2$(SO$_4$)$_3$ + FeSO$_4$ | 6 | 0.5 | 50 | 8.3 | 0.5 + 0.5 | 20 + 40 |

Example 6

According to the general method described in example 1, different basic L-amino acids were used to form L-amino acid-hexametaphosphate complexes which were then precipitated with FeSO$_4$ according to table 5 below.

TABLE 5

| Exp. | Amino acid | aa/HMP (molar ratio) | N/P (molar ratio) | HMP (ml) | Amino acid (M) | Amino acid (mL) | 0.5M FeSO$_4$ (mL) |
|---|---|---|---|---|---|---|---|
| A1 | lysine | 6 | 2 | 10 | 0.5 | 60 | 60 |
| A2 | lysine | 12 | 4 | 10 | 0.5 | 120 | 60 |
| A3 | histidine | 6 | 3 | 2 | 0.17 | 35 | 12 |
| A4 | histidine | 12 | 6 | 2 | 0.17 | 70 | 12 |

Example 7

This example relates to the germination and growth of pine with different types of arginine phosphate complexes. Five different arginine phosphate complexes arginine-monophosphate (2), arginine-diphosphate (3), arginine-hexametaphosphate, (4) and arginine-hexametaphosphate-Fe(II) (5), and finally (6) arginine-P10000, prepared according to Example 9, were tested in peat. Arginine-HCl was used as reference (1). A set of 40 pots were filled with 50 ml of peat mixed with one of the five different arginine complexes, such that each pot got 20 mg N, measured by the number of nitrogen atoms in the arginine complexes. Scots Pine seeds were sown in the pots and grown in greenhouse 16/8 h day/night and 23° C., with the pots watered 2 times a day with a total growth period of 8 weeks. The seedlings were harvested, the peat was washed away and the seedlings were dried and dry weight was recorded, see FIG. 12.

Thus, the results of this example show that the solubility of the different arginine phosphate complexes affects growth and germination of pine seedlings. It may be that too rapidly dissolving forms of arginine phosphate complexes may lead to a reduced germination and decreased growth of the seedlings. This may be due to nitrogen toxicity, and may be tested by the skilled person to fine-tune the preparation of a fertilizer according to the invention to suit desired needs of germination and other factors.

Example 8

Figure 13:
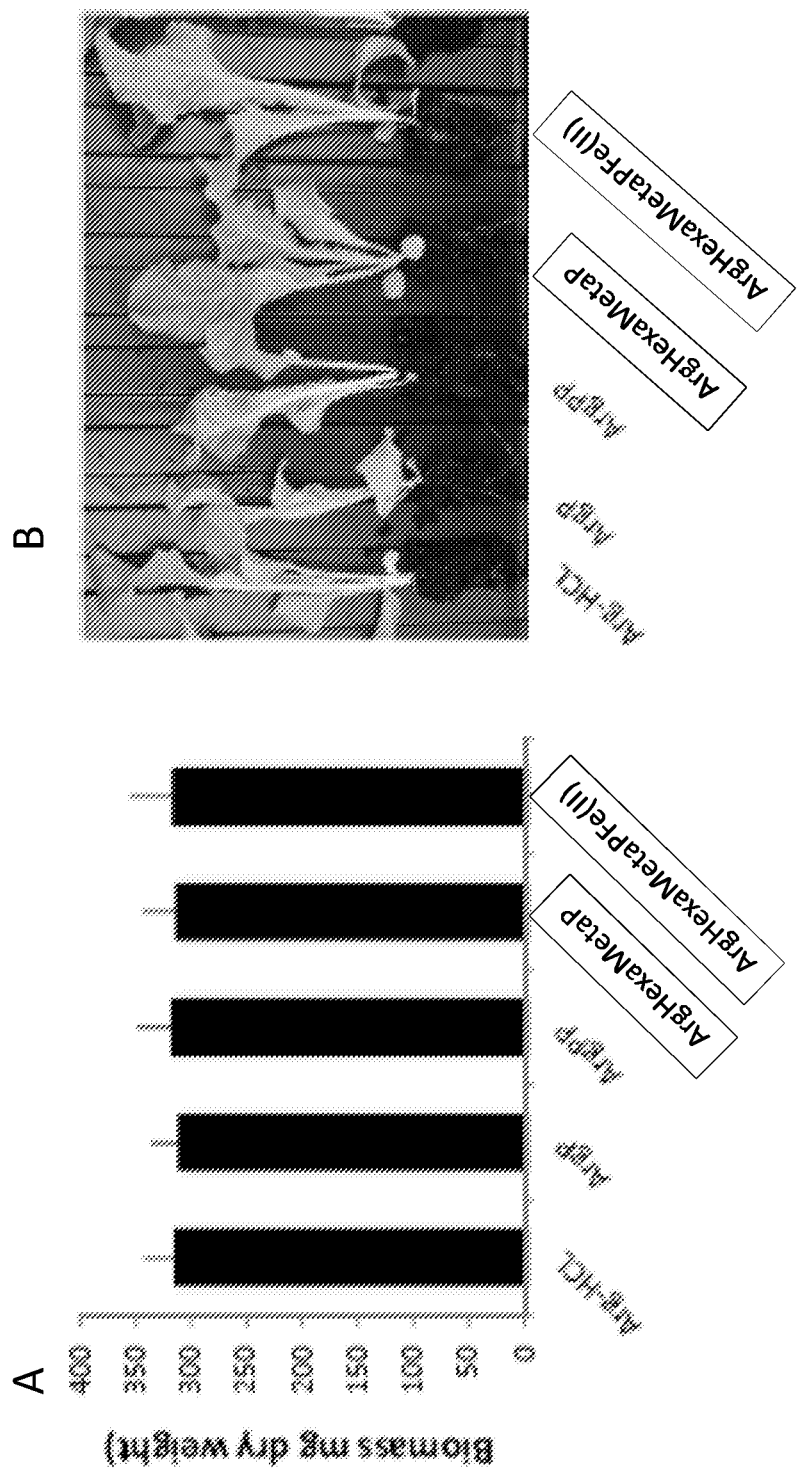
FIG. 13A-B shows the effect of different arginine-polyphosphate complexes on the growth of lettuce.

This example relates to the germination and growth of a fast growing plant, such as lettuce with different types of arginine phosphate complexes. Five different arginine phosphate complexes, as described in Example 7, were mixed with peat, and forty pots filled with 20 mg N of the different arginine complexes were mixed with unfertilized peat with a total volume of 100 ml per pot for each treatment. A set of 40 pots was 3.0 filled with 100 ml of peat mixed with one of the five different arginine complexes, i.e. 40 pots with each treatment, such that each pot got 40 mg N, measured by the number of nitrogen atoms in the arginine complexes. Lettuce (*Lactuca sativa*) seeds were sown in the pots and grown in greenhouse 16/8 h day/night, 23° C. The pots were watered two times a day with a total growth period of 5 weeks. The lettuce seedlings were harvested, the soil was washed away and the seedlings were dried and dry weight was recorded. The results are shown in FIG. 13, where 13A illustrates the biomass of dried plants in mg dry weight fertilized with five different arginine complexes and 13B shows a photo the lettuce plants.

As lettuce is a relatively fast growing plant, the size of the different polyphosphates used may have less impact on growth than what has been observed for more slowly growing plants. However, as these results show, the present invention will still work as a fertilizer for the fast growing plants as well, for the period of time required, and the skilled person may based on this knowledge fine-tune the chemical composition of a fertilizer according to the invention especially in view of the length of the P chain of the complex to include the required amount of nutrients. Such optimization will benefit the environment, as it will enable fertilizers to comprise the amount of nutrients required for growth, whereby unnecessary amounts which may leak to the environment are reduced or even avoided by the present invention.

Example 9

This example relates to the preparation of arginine polyphosphate with a chain length of approximately 10000 phosphorus atoms. Arg-P10000 was done by adding 100 g polyphosphate crystals, normally used as a cation exchange resin, to 500 ml of 0.5 M arginine solution with stirring for 24 h. Crystals were washed with 500 ml $H_2O$ three times and dried. These crystals were also used in the germination tests discussed in example 7.

One hundred milligram of the Arg-P10000 crystals were treated with either 5 ml of $dH_2O$, 0.5 mM $CaCl_2$, or 0.5 mM oxalacetic acid in a 15 ml Falcon tube. The Falcon tubes were left on a rolling table (15 rpm) for two week at room temperature, at which time the solution was analysed for arginine (UPLC) and phosphate (ion chromatography). New solutions were added and the process was repeated over a period of 12 weeks. The results are shown in FIG. 14. The release of arginine (FIG. 14A) and phosphate (FIG. 14B) over time is very low, creating a long-lasting fertilizer. Thus, an arginine polyphosphate fertilizer according to the invention with longer chains may be used for long periods of time as a really slow releasing fertilizer.

The invention claimed is:

1. A solid phase fertilizer composition comprising precipitated complexes consisting of basic L-amino acid, polyphosphate, and Fe(II) and/or Fe(III) metal ion(s), wherein the number of phosphorous atoms in the polyphosphate is at least or equal to six and wherein metal in the complexes consists of Fe(II) and/or Fe(III).

2. The fertilizer composition according to claim 1, wherein the basic L-amino acid is L-arginine and/or L-lysine.

3. The fertilizer composition according to claim 1, wherein the complexes contain Fe(II) metal ion.

4. The fertilizer composition according to claim 1, wherein the complexes contain Fe(III) metal ion.

5. The fertilizer composition according to claim 1, wherein the number of phosphorous atoms in the polyphosphate is at least or equal to 10,000.

6. The fertilizer composition according to claim 1, which comprises one or more additional macronutrient(s) and/or micronutrients.

7. A fertilizer preparation which comprises the fertilizer composition according to claim 1 in particulate or granular form.

8. A solid phase fertilizer preparation which comprises a combination of two or more differently composed solid phase fertilizer compositions, wherein each of the two or more differently composed fertilizer compositions comprises precipitated complexes consisting of basic L-amino acid, polyphosphate, and Fe(II) and/or Fe(III) metal ion(s), wherein the number of phosphorous atoms in the polyphosphate is at least or equal to six and wherein metal in the complexes consists of Fe(II) and/or Fe(III).

9. A method of preparing a solid phase fertilizer composition, which method comprises providing a liquid comprising at least one basic L-amino acid; adding a polyphosphate source; adding a source of Fe(II) and/or Fe(III) metal ions; increasing the pH to precipitate a complex consisting of basic L-amino acid, polyphosphate, and Fe(II) and/or Fe(III) metal ion(s), wherein the number of phosphorous atoms in the polyphosphate is at least or equal to six and wherein metal in the complex consists of Fe(II) and/or Fe(III); and collecting and drying the precipitated complex to provide a solid phase fertilizer.

10. The method according to claim 9, wherein the liquid comprises fermentation liquid.

11. The method according to claim 10, wherein the liquid comprises a fermentation by-product.

12. The method according to claim 9, wherein the liquid is a liquidized protein hydrolysate, optionally subjected to one or more steps of pre-treatment.

13. The method according to claim 9, wherein the basic L-amino acid is L-arginine and/or L-lysine.

14. The method according to claim 9, wherein the polyphosphate source is a phosphate powder dissolved in water.

15. The method according to claim 9, wherein the pH of the polyphosphate source is close to that of the liquid comprising at least one basic L-amino acid.

* * * * *